United States Patent [19]

Silvestrini et al.

[11] Patent Number: 5,374,435
[45] Date of Patent: Dec. 20, 1994

[54] METHOD OF BATCH COOKING AND PACKING FRUIT AND VEGETABLE PIECES

[75] Inventors: Jesus A. Silvestrini; Andres H. Parentini; Carlos H. Masareje, all of Mendoza, Argentina

[73] Assignee: Imdec, S.A., Mendoza, Argentina

[21] Appl. No.: 200,153

[22] Filed: Feb. 23, 1994

Related U.S. Application Data

[60] Division of Ser. No. 897,704, Jun. 12, 1992, which is a continuation-in-part of Ser. No. 877,990, May 4, 1992, abandoned.

[51] Int. Cl.⁵ ............................................. A23L 3/00
[52] U.S. Cl. ................................... 426/231; 426/399; 426/508; 426/510; 426/523
[58] Field of Search ............... 426/231, 399, 407, 508, 426/509, 510, 511, 521, 523; 99/325, 330, 352, 356, 357, 403, 407

[56] References Cited

U.S. PATENT DOCUMENTS

| | | | |
|---|---|---|---|
| 1,978,078 | 10/1934 | Eberts | 99/473 |
| 2,057,366 | 10/1936 | Chapman | 53/18 |
| 3,332,338 | 7/1967 | Wein | 99/330 |
| 3,603,240 | 9/1971 | McCarthy | 99/356 |
| 3,733,998 | 5/1973 | Vischer, Jr. | 99/330 |
| 3,992,984 | 11/1976 | Treiber | 426/511 |
| 4,047,476 | 9/1977 | Liebermann | 99/325 |
| 4,059,919 | 11/1977 | Green | 426/509 |
| 4,137,177 | 1/1979 | Shoda | 210/403 |
| 4,181,072 | 1/1980 | Hirahara | 99/353 |
| 4,189,504 | 2/1980 | Jimenez | 426/399 |
| 4,505,193 | 3/1985 | Mariotti | 99/356 |
| 4,543,878 | 10/1985 | Luchetti | 99/407 |
| 4,732,080 | 3/1988 | Vita | 99/407 |
| 4,765,894 | 8/1988 | Inaba | 210/393 |
| 4,803,917 | 2/1989 | Barbieri | 99/356 |
| 4,830,865 | 5/1989 | McFarlane et al. | 426/399 |
| 4,929,459 | 5/1990 | Silvestrini | 426/399 |
| 4,975,189 | 12/1990 | Liszka | 210/327 |
| 4,979,435 | 12/1990 | Hayashi et al. | 99/357 |
| 5,070,774 | 12/1991 | Rosso et al. | 99/403 |
| 5,142,966 | 6/1992 | Morandi et al. | 99/352 |

FOREIGN PATENT DOCUMENTS 3247250 11/1991 Japan ........................ 99/356

*Primary Examiner*—George Yeung
*Attorney, Agent, or Firm*—Pettis & McDonald

[57] ABSTRACT

An apparatus and method are disclosed for a batch cooking and packing process for pieces of a food product such as fruits and vegetables. The process includes collecting a predetermined quantity of the uncooked food product, depositing that quantity by gravity flow into a closed cooking chamber containing a quantity of liquid for use with the food product, then heating the food product by recirculating the liquid through a heat exchanger to heat the liquid and food product to a cooking and sterilizing temperature and then removing the liquid from the cooking chamber until the total combined volume of liquid and food product remaining substantially equals the desired quantity of food product and liquid desired to be deposited into a predetermined shipping container, and depositing the remaining food product and liquid from the cooking chamber through a cooking chamber delivery port into the shipping container and sealing that shipping container. If desired, the food product and liquid may be cooled before being deposited into the container.

35 Claims, 5 Drawing Sheets

METHOD OF BATCH COOKING AND PACKING FRUIT AND VEGETABLE PIECES

This application is a division of application Ser. No. 07/897,704, filed Jun. 12, 1992, entitled "Apparatus for Batch Cooking and Packing Fruit and Vegetable Pieces", which is a continuation-in-part of application Ser. No. 07/877,990, filed on May 4, 1992, entitled "Method and Apparatus for Batch Cooking and Packing Fruit and Vegetable Pieces", now abandoned.

BACKGROUND OF THE INVENTION

This invention relates generally to the field of food packing and more specifically to apparatus and processes for cooking and packing pieces of fruit and vegetables, whether whole, halves, slices, or chunks that are packed into containers with a covering liquid, such as juice, water, syrup, or the like. It is particularly directed to such method and apparatus for cooking and packing discrete batches of such food products.

Numerous types of apparatus have been developed for cooking food products, such as pieces of vegetables and fruits. Such apparatus has included continuous process cookers and certain types of batch cookers. In the continuous process apparatus the uncooked food products are fed into one end of the cooker, which typically is of the form of a conveyor, such as screw conveyor, that carries the food product along a predetermined path while contacting it with heated liquid and then discharges the product at the end of the path, where it is then received into a storage container for storing until it is to be packed into a shipping container. In various batch cooking units a predetermined quantity of the food product is placed into a container, such as a cooking retort, with heat being applied either by steam or by the introduction of heated liquid. Upon completion of the cooking process the food product is then removed from the cooking retort and held in a storage or dispensing container for subsequent transfer into a shipping container.

While various of these prior art cooking units have functioned with greater or lesser degrees of satisfaction, many, by their very nature, have subjected the food products to handling procedures that may result either in bruising or other damage to the food product pieces or possible contamination prior to packing in the shipping containers. This is particularly true in equipment incorporating aseptic packing in which the food product is packed at a temperature substantially below the sterilizing and cooking temperature. For such apparatus it is necessary to maintain completely aseptic conditions around the food product from the time it is cooled until it is sealed within the shipping container.

SUMMARY OF THE INVENTION

In order to overcome some of the disadvantages of the prior art, it is an object of the present invention to provide apparatus and a method for batch process cooking and packing of pieces of a food product such as a fruit or vegetable that minimizes the handling of that food product and reduces the exposure of the food product to bruising and contamination. In order to achieve this and other objects that will become readily apparent to those skilled in the art, there is provided such an apparatus and method in which a predetermined quantity of uncooked such food product is collected and deposited by gravity flow into a closed cooking chamber having a selectively openable and closable entrance port and a selectively openable and closable delivery port and containing a quantity of liquid for use with such food product such that the liquid cushions the fall of the food into the cooking chamber, then heating that batch of food product by recirculating the liquid through a heat exchanger to heat the liquid and the food product contacted thereby to a cooking and sterilizing temperature, then removing the liquid from the cooking chamber until the quantity of the liquid and food product remaining substantially equals the volume of a predetermined shipping container, and then depositing that remaining food product and liquid directly from the cooking chamber through the selectively openable and closable delivery port into a shipping container and sealing that shipping container. The apparatus of this invention provides all of such functions and positions a shipping container subjacent the cooking chamber delivery port to receive the liquid and food product and includes structure for sealing that shipping container after the reception of the liquid and cooked food product.

BRIEF DESCRIPTION OF THE DRAWINGS

Several preferred embodiments of the apparatus of this invention, as well as the method of practicing this invention, will be described in detail in connection with the drawings in which.

DETAILED DESCRIPTION OF PREFERRED EMBODIMENTS

Figure 1:
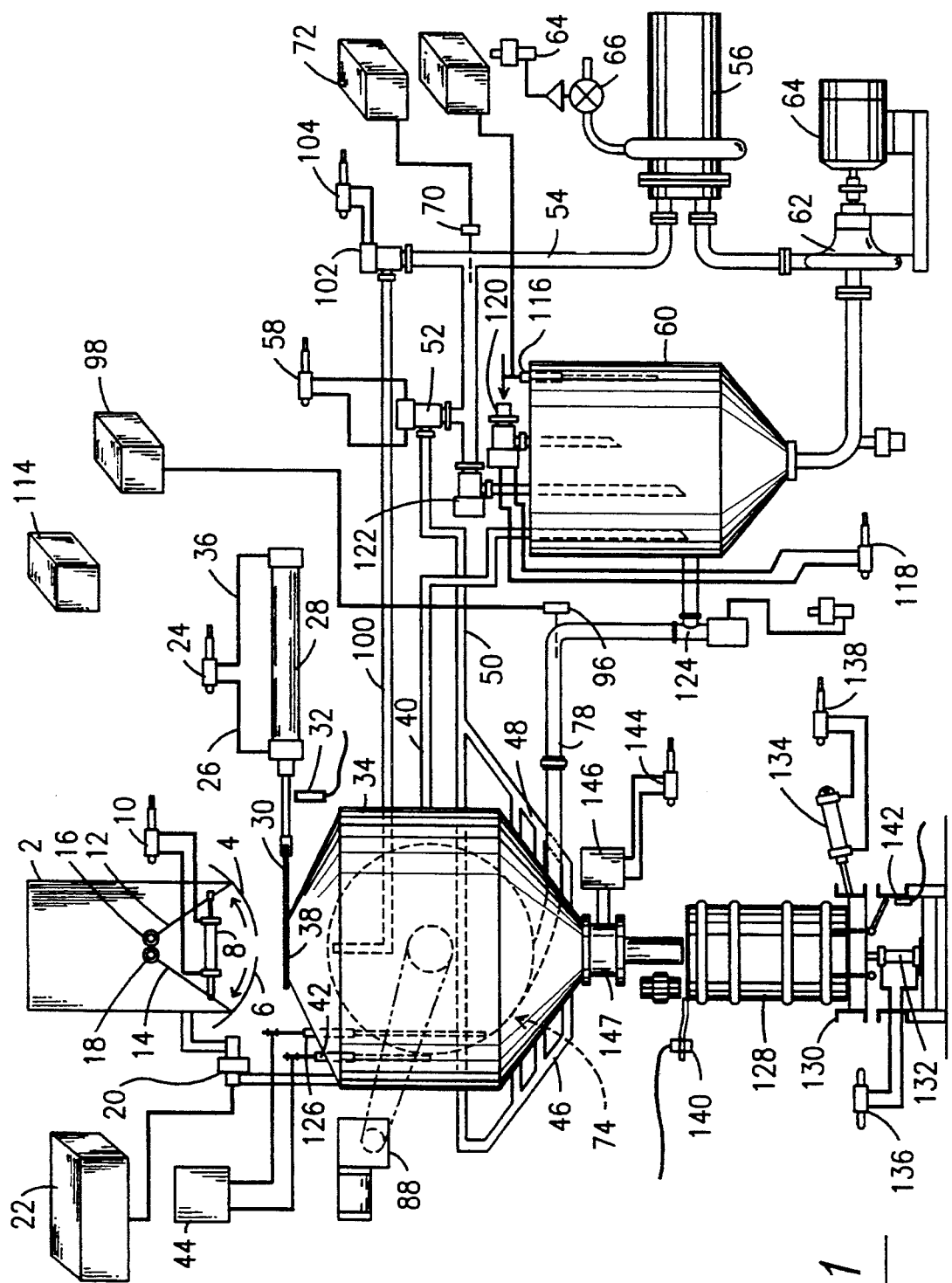
FIG. 1 is a schematic representation of one preferred embodiment of the apparatus of this invention utilized for hot packing of food products.
Figure 4:
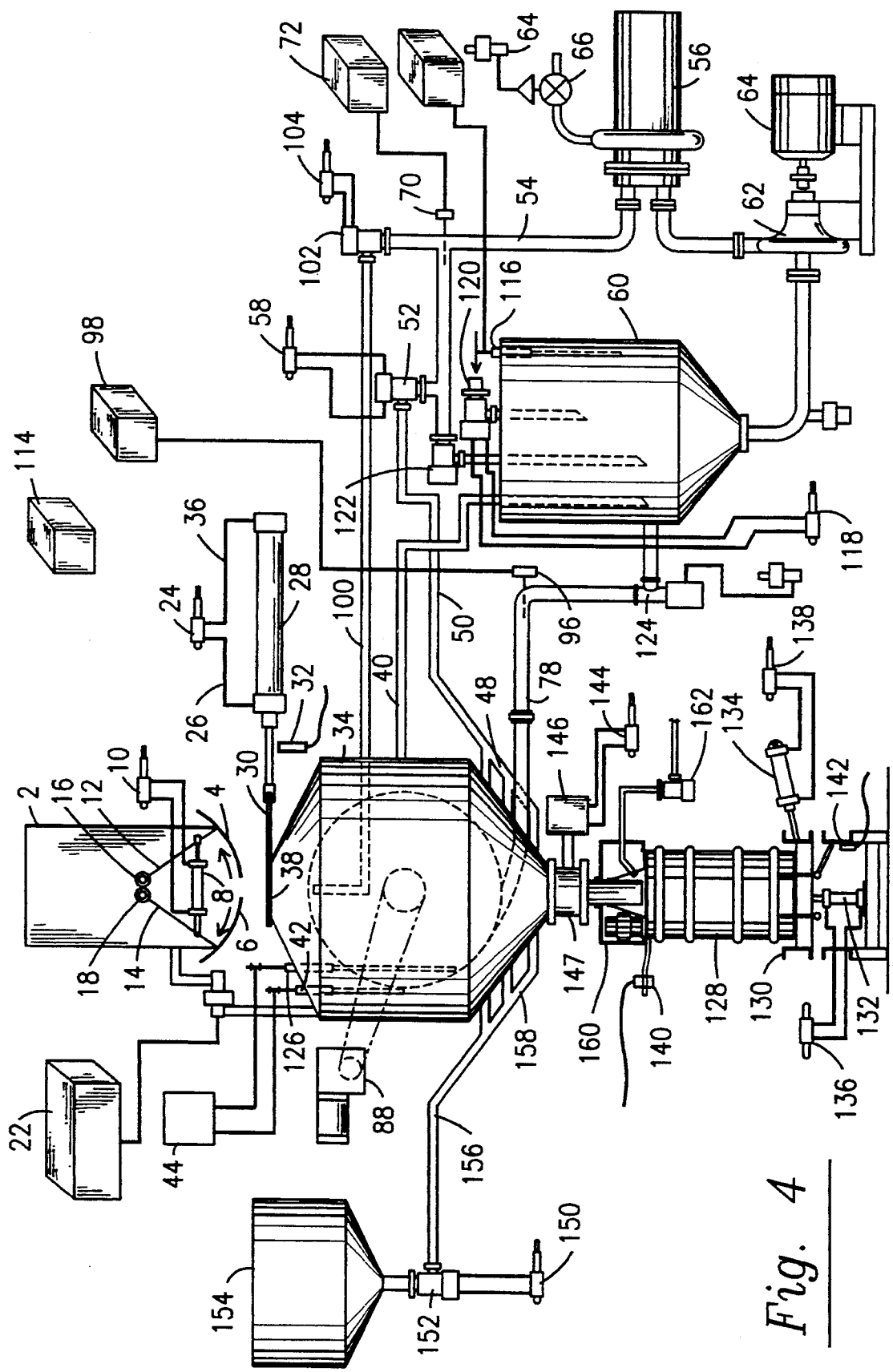
FIG. 4 is a schematic representation of a modification of the apparatus of FIG. 1 utilized for aseptic filling of drums with the cooked food products.
Figure 5:
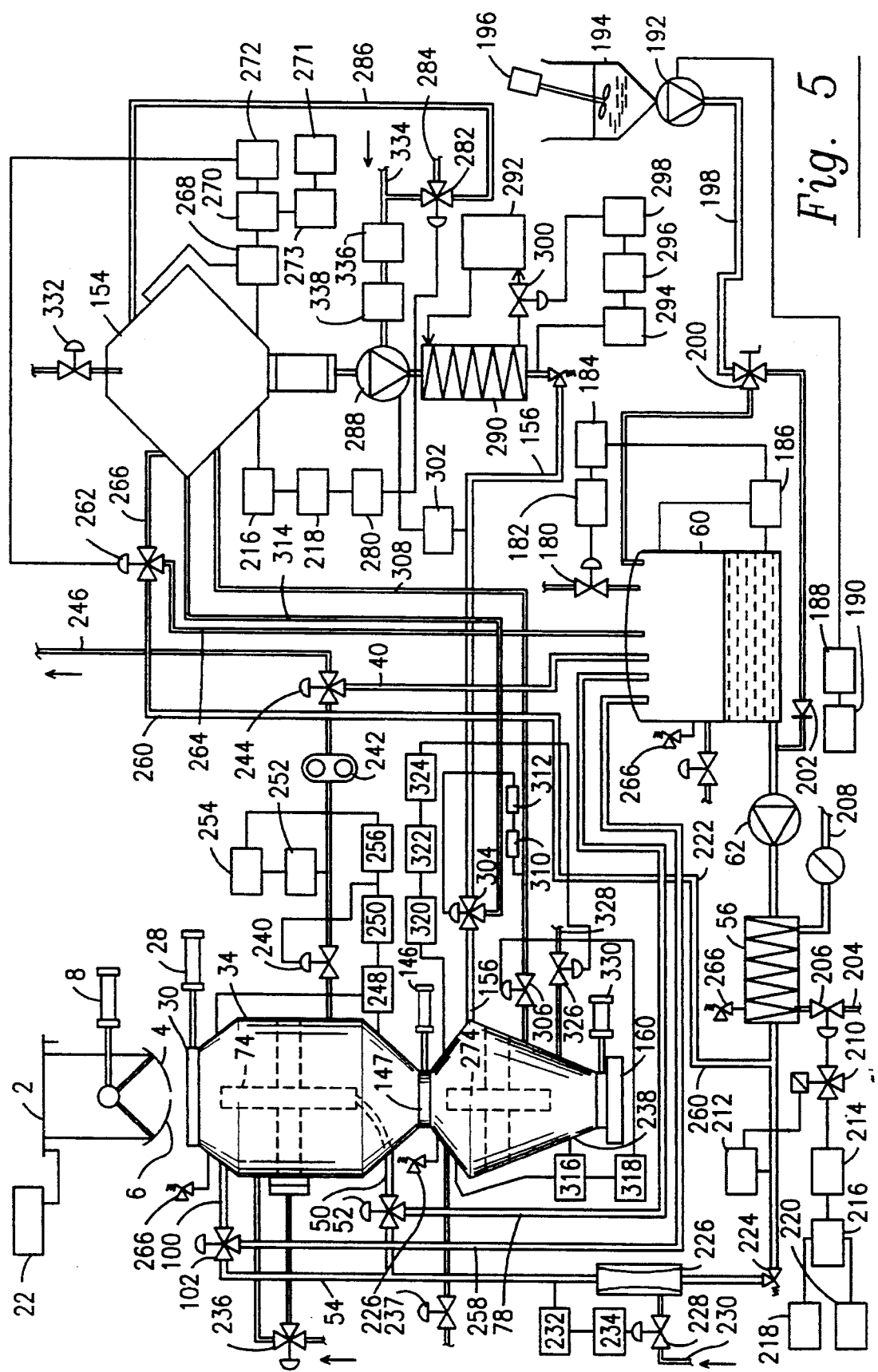
FIG. 5 is a schematic representation of a further modification of the aseptic filling apparatus of FIG. 4.

Three preferred embodiments of the apparatus of this invention are illustrated in the accompanying figures, with that illustrated in FIG. 1 for use with hot filling of shipping containers and those illustrated in FIGS. 4 and 5 being intended for cooler, aseptic filling of shipping containers. While the apparatus of FIG. 1 for use in hot filling containers will be described in detail first, many of the components in all three systems are substantially similar and will thus be referenced by the same reference numbers for all embodiments.

In FIG. 1 is illustrated a preferred embodiment of the apparatus of this invention for use with hot filling of containers. The apparatus includes means, such as a hopper 2, for collecting a batch comprising a predetermined quantity of an uncooked food product that is to be cooked and packed by the apparatus of this invention. A hopper 2 receives the uncooked food product, which may conveniently comprise pieces of fruits or vegetables, whether whole, halves, slices, or chunks, from a conventional transport, which may be an elevating conveyor (not shown) that transports the uncooked food product from prior processing stations where that food product may have been peeled and cut into desired sections or chunks. The base of the hopper 2 preferably is closed by selectively openable and closable doors 4 and 6 that are held in the closed position by the actuator 8, which may conveniently be a double-ended, double-acting pneumatic cylinder, operating under the control of controller 10, which is connected to a suitable source of pressurized fluid, such as compressed air. Upon receiving compressed air from the controller 10, the ends of the actuator 8 are urged outwardly of the actuator. These actuator ends are conveniently connected to the actuator arms 12 and 14, which extend between the doors 4 and 6 and their respective pivots 16 and 18.

The doors 4 and 6 of the hopper 2 are held closed until a predetermined weight of the food product is received in the hopper. This weight is determined by the transducer 20, which is connected to a scale 22 that preferably has programmed into it both the tare weight of the hopper 2 and its respective door assembly and also the desired total weight of the hopper assembly and the food product, to establish a desired net weight of food product to be received. Upon receiving the desired quantity of food product within the hopper 2, the feeding of such products into that hopper is then stopped. At that time actuator 24 delivers a pressurized fluid, such as compressed air, to line 26 of actuator cylinder 28, thus driving the piston rod and its attached cooking chamber entrance port door 30 to the right in FIG. 1 until that door is proximal the door open position proximity sensor 32. With that entrance port of the cooking chamber 34 thus open, the actuator 8 controlling the doors 4 and 6 of the hopper 2 is activated to an open position, thus depositing by gravity the food product through the cooking chamber entrance port into the interior of the cooking chamber 34. This cooking chamber 34 preferably has the lower portion thereof filled with a liquid, such as juice, syrup, water, or the like, to be used in packing the fruit or vegetable, which liquid serves to cushion the fall of the food chunks to reduce any tendency to bruise the food product. When the transducer 20 detects that the hopper 2 is again empty, the doors 4 and 6 are closed by the actuator 8 to begin the loading process again.

Once the food product is deposited into the cooking chamber 34, the controller 24 releases pressure on the line 26 and applies pressurized fluid to the line 36, thus urging the piston rod and entrance port cover 30 back to the left in FIG. 1 to seal off the entrance port 38. Once the entrance port is closed, the level of the liquid within the cooking chamber 34 is increased until it reaches a level preferably slightly below the level of the overflow line 40. This overflow line 40 is slightly above the level of the conventional liquid level sensor 42, which is connected to the controller 44 similar to those known in the art. The function of this sensor 42 and controller 44 at this point is maintain the desired level of liquid and food product in the cooking chamber 34 and to signal any unintended drop of the juice or liquid level within the cooking chamber below that measured by sensor 42 during the time that cooking is to take place.

The juice or other liquid introduced into the cooking chamber to raise the level enters through manifolds 46 and 48, which are connected to supply line 50. These manifolds 46 and 48 preferably introduce the liquid into the lower portion of the chamber in a direction generally tangential to the inside of the lower generally conical wall of that cooking chamber 34 to promote a swirling or turbulent motion of the liquid to facilitate mixing and thus enhanced heat transfer between the liquid entering and the food product. The supply line 50 of that liquid is connected through valve 52 to an outlet line 54 from heat exchanger 56. Controller 58 selectively operates valve 52, opening it to provide the heated cooking liquid to the cooking chamber 34 or closing it when no more is desired. The heat exchanger 56 receives the liquid from reservoir 60 through pump 62, which may conveniently be a centrifugal sanitary pump driven by any suitable prime mover 64, such as an electric motor. The heat exchanger 56 obtains heat from a convenient source, such as a steam generator (not shown), through inlet valve 66 controlled by controller 68 to heat the liquid flowing through that heat exchanger 56. A suitable sensor 68 detects the temperature of the liquid leaving the heat exchanger 56 and, through its controller 70, provides appropriate signals to the controller 68 operating the steam inlet valves 66 to maintain the desired temperature of that heated liquid.

Once the liquid in the cooking chamber has been brought up to and maintained at the desired level as indicated by sensor 42, a level suitably slightly below that of the overflow outlet 40, the liquid is then recirculated through the cooking chamber 34 and the heat exchanger 56 to achieve and maintain a desired cooking temperature within that chamber 34. Except for overfill situations when the liquid may leave the cooking chamber through overflow 40, the liquid is normally circulated through a filter assembly 74, shown in phantom in FIG. 1 and in greater detail in FIGS. 2 and 3.

Figure 3:
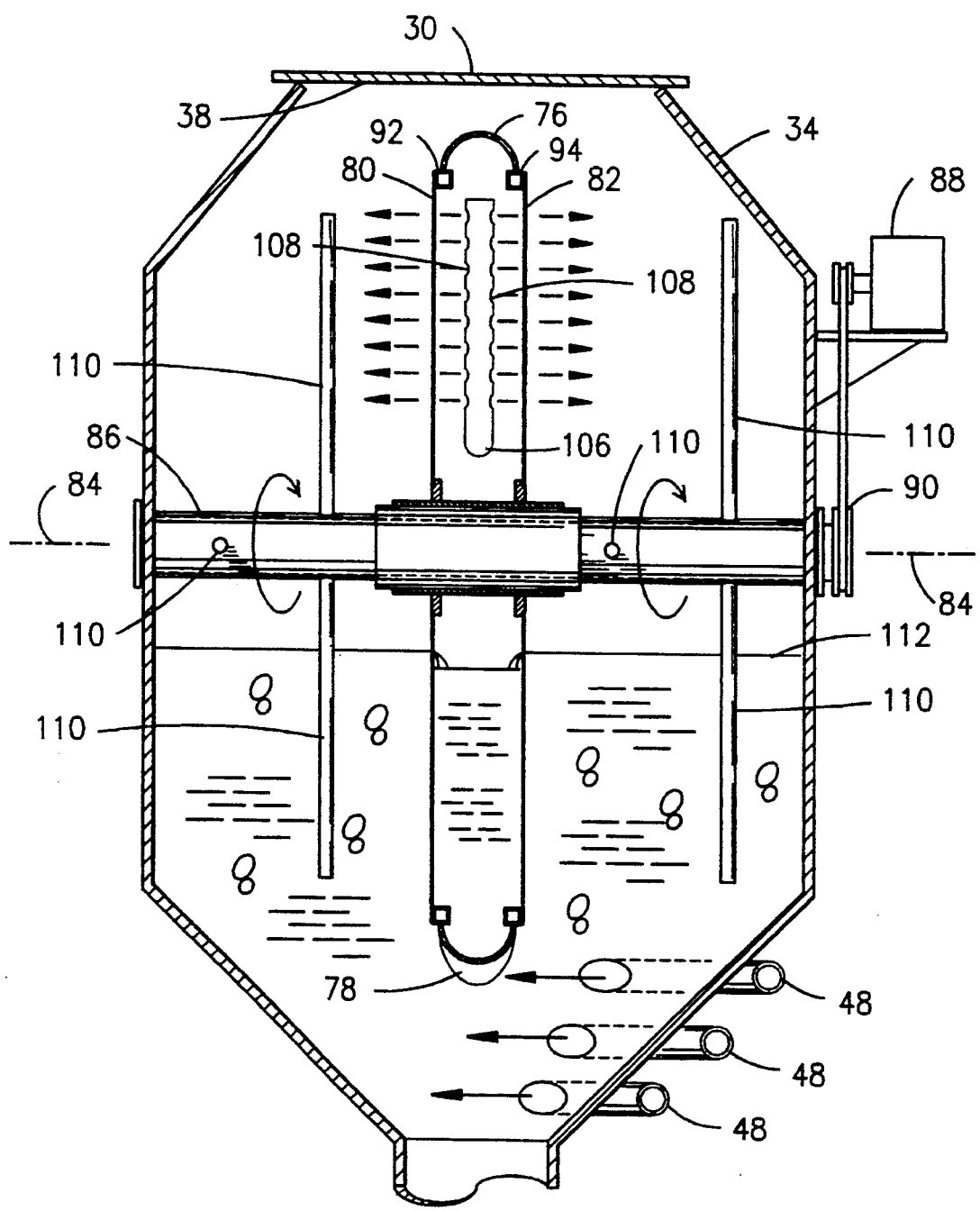
FIG. 3 is a sectional view taken along lines 3—3 of FIG. 2.

In FIG. 3 is shown a fragmentary side sectional view taken through the center of the cooking chamber 34 and showing a side elevational view of the filter assembly 74. This filter assembly 74 suitably comprises a filter chamber 76, suitably in the form of an annular ring having a liquid withdrawal conduit 78 connected thereto, preferably to the lower portion of chamber 76. This conduit 78 extends through the lower, suitably conical, wall of the cooking chamber 34 and may be affixed thereto to provide support for the entire filter chamber 76. At least one disk member 80, and preferably a pair of such disk members 80 and 82, are mounted to means for rotatably driving such disks about an axis of rotation 84. Preferably this rotatable driving means comprises a shaft rotatably journaled to the cooking chamber 34 and driven by a conventional prime mover, such as a motor 86 connected through a conventional belt and pulley arrangement 90, or other convenient arrangement, to one end of that shaft 86. The disk members 80 and 82 preferably are affixed proximal their center to that shaft 86 for rotation therewith about the axis of rotation 84, which is generally transverse to the broad surfaces of the disks 80 and 82. Adjacent the outer peripheries of the disks 80 and 82 are provided sliding seals 92 and 94 engaging both the respective disks 80 and 82 and the filter chamber 76 to provide for sliding engagement between the disks 80 and 82 and the filter chamber 76, but substantial liquid sealing therebetween.

Figure 2:
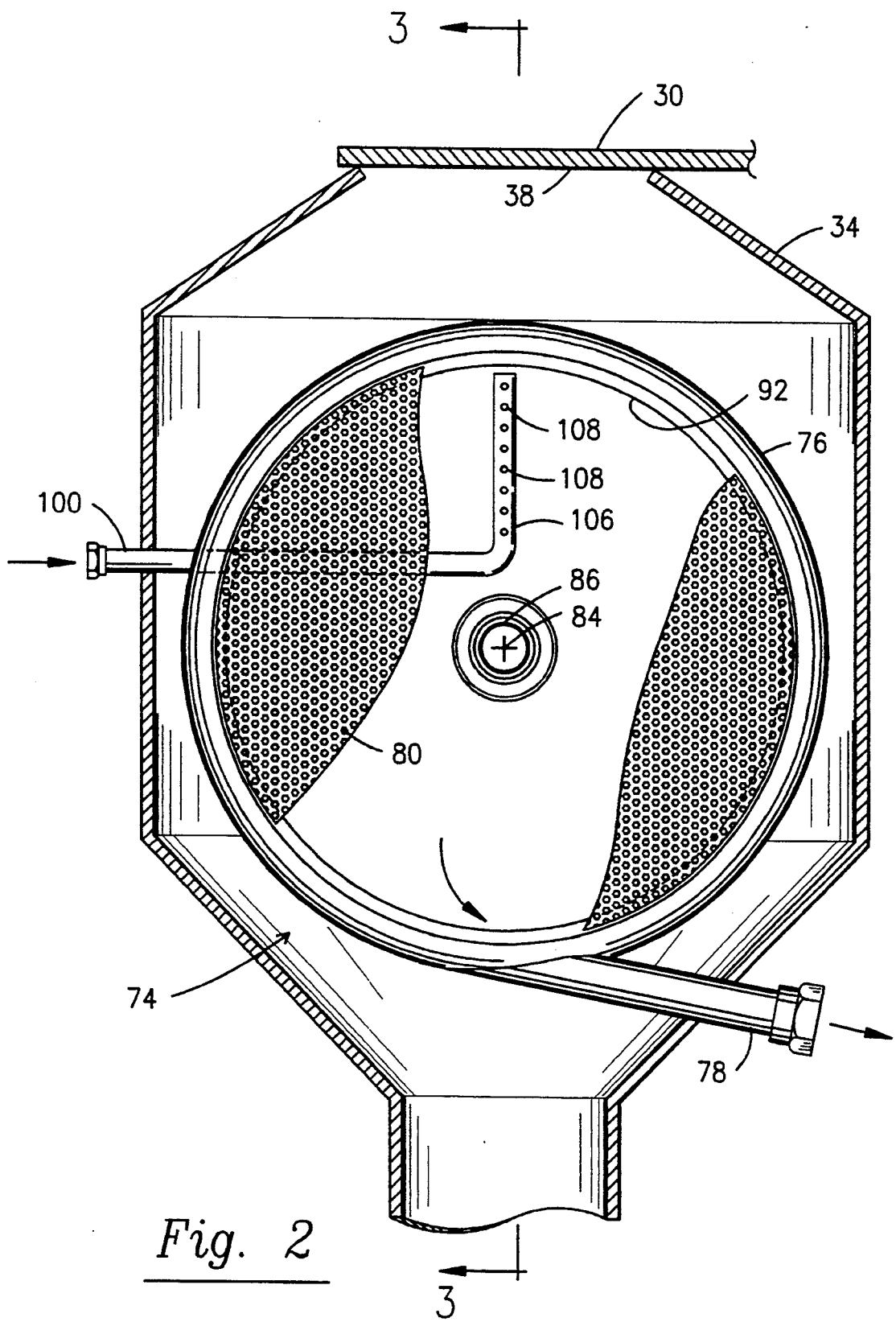
FIG. 2 is a side sectional view at a larger scale of the cooking chamber of the apparatus of FIG. 1 more clearly illustrating the filter apparatus that is shown in phantom within the cooking chamber of FIG. 1.

FIG. 3 illustrates that each of the disks 80 and 82 have one side thereof facing inwardly of the filter chamber and the other side facing outwardly thereof. These disks have a plurality of apertures extending therethrough, as is best shown in FIG. 2. These numerous apertures through the respective disks are preferably sized such that the liquid within the cooking chamber 34 may pass through the apertures, while the food product being cooked within that chamber is blocked. This provides for withdrawal of the liquid from within the cooking chamber through those filter disks 80 and 82 and out the conduit 78 for recirculation through the reservoir 60 and the heat exchanger 56 and then back to the cooking chamber through the valve 52, supply line 50 and manifolds 46 and 48. A suitable temperature sensing device 96, such as a thermocouple, is provided in the withdrawal conduit 78 to measure the temperature of the liquid withdrawn from the cooking chamber 34. This liquid withdrawal temperature is then registered with controller 98.

As is shown most clearly in FIG. 2, the filter assembly 74 is also provided with apparatus for cleaning and preventing blockage of the apertures on the filter disks 80 and 82. This cleaning apparatus includes an inlet conduit 100 that is connected through valve 102, operated by controller 104, to the supply line 54 of the heated liquid exiting the heat exchanger 56. The filter cleaning conduit 100 extends through the wall of the cooking chamber 34 and preferably also through the filter chamber 76 and terminates in a spray head having at least one aperture 108, and preferably a plurality of such apertures, for each directing a stream of liquid axially outwardly of the filter assembly. Thus, the liquid streams urge any pieces of the food product that may be lodged in the apertures of the respective filter disks 80 and 82 outwardly of the filter chamber, thus reopening any such blocked apertures. This filter cleaning process may be started and stopped at any desired time through valve controller 104 and valve 102.

FIG. 3 illustrates not only that the axis of rotation 84 of the shaft 86 is preferably generally horizontal, but also that stirring members 110 suitably extend transversely outwardly of the shaft 86 at various points. Thus, rotation of the shaft 86 will cause these meanders 110 to stir the liquid/food product mixture 112 shown in FIG. 3 to further improve the mixing and heat transfer between the liquid and the food product.

As the recirculation of the hot liquid from the heat exchanger 56 continues through the cooking chamber 34, heat from that liquid will be transferred to the food product that it contacts. Until that food product reaches the desired cooking temperature, such heat transfer from the liquid to the food product will result in the liquid flowing out the withdrawal conduit 78 and past temperature sensor 96 being at a lower temperature than the liquid at cooking temperature that is introduced into the cooking chamber through the manifolds 46 and 48. However, once the food product reaches the cooking temperature, the liquid flowing past the sensor 96 will indicate a temperature generally corresponding to that cooking temperature. At that point a timer 114 is activated to signal the cooking time for the food product. It is to be understood that different types of food products require different temperatures and different times for cooking, which times and temperatures are well known to those skilled in the art.

During the cooking process the level of the liquid in the reservoir 60 is maintained at a predetermined level by sensor 116. If the level drops below the minimum desired point, actuator 118 opens valve 120 to introduce any additional amount of liquid into the reservoir 60 from an outside supply (not shogun). That sensor 116 also serves to prevent overfilling of the reservoir 60, maintaining sufficient capacity to receive back into the reservoir 60 all of the heated liquid being recirculated through the cooking chamber and heat exchanger.

At the end of the desired cooking time the timer 114 provides an appropriate signal and activates actuator 58, closing valve 52 and thus terminating further introduction of the liquid through conduit 50 and manifolds 46 and 48 into the cooking chamber 34. At this time valve 122 is also opened, permitting the liquid previously flowing through valve 52 and conduit 50 to flow directly back into the reservoir 60. These steps initiate the draining process from the cooking chamber, with the liquid draining through valve 124 into the reservoir 60 until the level of the combined liquid and food product within the cooking chamber drops to the level measured by sensor 126, which preferably substantially equals the volume of the shipping container to be filled with that cooked food product and liquid. Then the controller 44 serves to close valve 124 to stop the draining of the chamber and also to close valve 102 to stop any further filter washing flow through the filter conduit 100. Thus, the cooking chamber 34 contains the desired amount of cooked, hot food product and liquid to be deposited into a shipping container.

At this point a suitable shipping container 128, preferably either in the form of a metal drum, or of a flexible bag either by itself or within a metal or fiberboard drum, is sterilized and brought into position by a suitable conveyor mechanism 130 and placed under the cooking chamber 34. A conventional centering and lifting system, suitably incorporating actuating cylinders 132 and 134, adjusts the shipping container by valves 136 and 138 until the sensors 140 and 142 indicate that the shipping container is appropriately centered and raised to the desired position beneath the delivery port of the cooking chamber 34. At this point the actuator 144 opens the valve 146 on the selectively openable and closable delivery port 147 of the cooking chamber 34 to permit the hot, cooked food product and liquid within that chamber 34 to be deposited directly into the shipping container 128. Upon completion of that container filling operation, the top of the container is sealed in a conventional manner and the container is lowered by cylinder 132 under control valve 136 to provide for removal of that shipping container to an appropriate storage location. At this point a cushioning level of liquid is reintroduced into the cooking chamber 34 through conduit 50 and manifolds 46 and 48, and the next batch of the food product is deposited into the cooking chamber 34 from the supply hopper 2, and the process is repeated again.

It should be noted that this apparatus and procedure provides a significant advantage over known prior art systems in providing for the deposit of the hot, cooked food product from the cooking chamber directly into the shipping container, thus reducing both the chances for damage of the food product and the possibility of spoilage. Because the food product is deposited into the drum at a temperature above the sterilizing temperature, this arrangements avoids problems of damage or contamination that occur when the product is allowed to cool or is otherwise further handled prior to packing in the shipping containers.

In FIG. 4 is illustrated an alternative embodiment of the apparatus of this invention, which constitutes a modification of the apparatus and process for use with an aseptic filling procedure. To the extent that almost all of the components are substantially identical to those disclosed with respect to the embodiment of FIG. 1, the same reference numbers have been used, and the description given above is incorporated by reference. To the extent that the apparatus and the method of its operation differ, new reference numbers have been added in connection with the description set forth below.

The operation of the embodiment of FIG. 4 preferably is substantially identical to that of FIG. 1 through the end of the cooking process. However, in the draining process, the valve 124 is kept open until the hot liquid from the cooking chamber 34 is substantially fully drained, leaving the hot, cooked food product substantially without liquid. At that point the valve 124 is closed and actuator 150 opens valve 152 connected to the sterile reservoir 154 of cold, aseptic liquid. This cold liquid flows through the conduit 156 and manifold 158 into the cooking chamber 134 to mix with the hot, cooked food product. This liquid is maintained in the sterile reservoir 154 at a temperature low enough to absorb the heat from the food product and thus obtain a mixture of the food product and liquid at an appropriate temperature for its preservation, preferably between about 35° C. and 40° C. After a predetermined time, when the food product heat has been substantially completely transferred to the liquid to achieve the desired temperature, this liquid is then drained through valve 124 until the desired volume of liquid and food product together, preferably about the same as the volume of the container to be filled, is obtained within the cooking chamber 34.

During the time that the food product is being cooled by the cold liquid introduced from the reservoir 154, it may be desirable to introduce an inert gas, such as nitrogen or the like, into cooking chamber 34 at a pressure slightly greater than atmospheric to reduce the likelihood of oxidation or contamination of the food product until it is sealed in the shipping container. Such overpressure of an inert gas may also be desirable in the cold liquid reservoir 154 to prevent oxidation of that liquid as well.

As described above in connection with the embodiment of FIG. 1, a shipping container 128 is moved into position beneath the cooking chamber delivery port and is centered and lifted into place. However, in this embodiment, the head of the shipping container 128, which is illustrated in this embodiment as a rigid drum but could also be the neck of a flexible bag, is introduced into a chamber 160 surrounding that delivery port and open at the bottom to sealingly receive the head of that drum. Once the container 128 is in position and sealingly engaged with the housing 160, a suitable sterilizing agent, which may conveniently be steam, is introduced into that housing 160 and thus both within the drum and over the head of the drum. In FIG. 4 the sterilizing agent may conveniently be introduced from an external source (not shown) through valve 162, which is activated shortly after the container 128 is introduced into sealing engagement with the housing 160. The sterilized container 128 is then aseptically filled while the head of that container is enclosed within the chamber 160.

Once the shipping container 128 has been filled, and while the head of that container is still sealed within the aseptic enclosure 160, the filling opening in the top of the container is then sealed in a conventional manner, such as described in my U.S. Pat. No. 4,929,459 with regard to a drum type container. Once the container 128 has been sealed, the cooking chamber delivery port valve 146 is closed and the container 128 is lowered from its engagement with the filling enclosure 160 and removed to an appropriate storage location. At this point the entire procedure may be repeated for cooking and cooling additional quantities of the food product and filling subsequent shipping containers.

In FIG. 5 is illustrated yet another embodiment of the apparatus of this invention, which embodiment constitutes a modification of the apparatus of FIG. 4 and is also for use with an aseptic filling procedure. While there are numerous additional components illustrated in FIG. 5, those in common with the embodiment of FIG. 4 utilize the same reference numbers as with FIG. 4, and the description given for that previous embodiment is incorporated by reference. To the extent that the apparatus and its method of operation differ, new reference numbers have been added in connection with the additional description set forth below. It is to be understood that the apparatus of the embodiment of FIG. 5 incorporates substantially all of the structure disclosed in connection with FIG. 4, and adds considerable additional structure to it. Thus, it is to be understood that the complete disclosure of the apparatus of FIG. 4 is incorporated by reference, even where some of the common elements are not illustrated on the drawing of FIG. 5 in order to provide room for clearer illustration of the additional features introduced in this embodiment.

As with the previous embodiments the product to be processed, whether it be vegetable or fruit in the form of dice, slices, or halves, or in other forms, is introduced into the reception hopper 2 by means of an elevator (not shown). The hopper 2 is supported by an electronic scale 22 equipped with a presetting of weight that is desired for processing. When the hopper is filled to the desired weight, the elevator stops and the product remains there prior to being deposited into the cooking chamber 34.

In the reservoir 60, also as described above, there is a certain amount of the liquid that is to be used in the cooking and cooling circuits. This liquid, as with the other embodiments, may be syrup, water, juice from the fruit or vegetable, or the like. The reservoir 60 has an automatic level control, described above, that commands a valve 180 for replacement liquid from an external source, as needed. It may be noted that the valve 180 is controlled by an operator 182 that is actuated by a level indicator controller 184, which receives liquid level signals from an appropriate transducer 186, which may conveniently be a double aseptic membrane type, such as disclosed in a Taylor Instrument Brochure No. 12-15a.

The reservoir 60 also features a pH adjustment and register control that includes a sensor and amplifier 188 connected to the exit of the reservoir adjacent pump 62 and sending its signals through amplifier and controller 190 which, upon measuring an acidity level too low, actuates the dosifying pump 192 connected to the exit of acid solution tank 194, which contains an agitator 196 therewithin. The additional acid solution is then delivered through line 198 and three-way valve 200 either directly into the top of the reservoir 60 or to the reservoir exit through check valve 210 to maintain the pH of the circulating liquid within a predetermined range.

Liquid from reservoir 60 is taken by the pump 62 and sent to the piping circuits through heat exchanger 56, which raises the juice temperature to a predetermined level, preferably about 98° C. This temperature is controlled by a steam control loop in which steam enters through line 204 and valve 206 and exits as condensed steam through line 208. The valve 206 is controlled by a solenoid valve 210 that receives its signals both from the flow control switch 212 and from the temperature sensing controller 214. This controller 214 in return receives its signals from the temperature indicating control register 216, which is fed by signals from the temperature transducer 218 and the low temperature alarm 220.

A portion of the heated liquid leaving the heat exchanger 56 will circulate to the cold liquid reservoir 154 through line 222 to provide for refilling any needed amounts into that cold liquid reservoir. The remainder of the liquid leaving the heat exchanger 56 will travel through the check valve 224 toward the cooking chamber. The juice being directed toward the cooking chamber 34 will travel through a steam ejector 226, which receives steam from valve 228 and steam supply line 230 to raise the temperature of the liquid exiting the ejector 226 to a predetermined temperature, preferably somewhat more than 110° C. The temperature of the liquid leaving the ejector 226 through line 54 is measured by the transducer 232, whose signal operates the temperature indicating controller 234 that operates the valve 228.

Before describing the cooking and cooling processes, it may be noted that the apparatus of this embodiment provides for sterilization of both the cooking and cooling chambers by the use of live steam. Specifically, before the food product is deposited into either the cooking tank 34 or the cooling chamber 238, to be described below, sterilization valve 236 and 237 are opened to direct live steam respectively into the cooking chamber 34 and filter assembly 74 therewithin, and the cooling chamber 238. Preferably, at about that same tithe, the cooking valve 52 and disk filter cleaning valve 102 are also open to begin supplying the hot liquid through lines 50 and 100, respectively, into the cooking chamber. After a brief period of time the steam injection valves 236 and 237 are closed, terminating the steam injection, and the liquid level control, described in the preceding embodiments, begins to operate.

In this embodiment an additional valve 240 operates with the level control mechanism to remove liquid from the cooking chamber, which liquid is taken by a pump 242 and sent through three-way valve 244 either through line 40 back to the cooking liquid reservoir 60 or through line 246 to a subsequent processing location where solids, as from the food product being cooked, are removed from the liquid for further use. As an example, where the food product may be tomato chunks and the liquid is tomato juice, the solids may be removed from that liquid to make tomato paste. The valve 244 may be operated manually, or may be automatically operated in response to signals from the level indicating transducer 186 associated with reservoir 60. The valve 240 proximal the cooking chamber 34 may suitably be operated by signals from the level transducer 248 sensing the level of liquid in the cooking chamber 34, with those signals then being processed into control signals by the level indicating controller 250 and fed to the valve 240 to open or close that valve. Once the level of liquid within the cooking chamber 34 is at the desired level for cooking, the cooking chamber entrance port door 30 is opened by the actuator 28, and the hopper doors 4 and 6 are opened by actuator 8 to deposit the food product contents of hopper 2 into the cooking chamber 34. When the scale 22 reaches zero, indicating that the hopper is then empty, the doors 4 and 6 and the cooking chamber entrance port 30 are then closed, and the loading elevator (not shown) is again activated to reload the hopper.

Once the food product is deposited in the cooking chamber, the cooking cycle is substantially as described with respect to the preceding embodiments, being controlled by the juice exit temperature measured by transducer 252, whose signals are fed through the temperature indicating controller 254 and then to the temperature indicating register 256. When the liquid temperature reaches the desired cooking temperature, which may suitably be about 96°-98° C., a timer associated with the register 256 is activated to signal the cooking time for the food product, which may typically be on the order of 1-2 minutes.

During the cooking process supplies of cooking liquid to the cooking chamber 34 and to the filter assembly cleaning mechanism are provided through valves 52 and 102, respectively. To the extent that the pump 62 provides a greater flow of the liquid out of the reservoir 60 than is needed for the disk cleaning process, the excess liquid is returned through three-way valve 102 and return line 258 to the reservoir 60. Any additional flow of the liquid may be diverted through bypass line 260 after the heat exchanger 56 and up through three-way valve 262 either back through return line 264 to the reservoir 60 or through line 266 into the cold liquid reservoir 154, as will be described below. This arrangement of return lines provides for the hot liquid to circulate continuously in the circuits due to the operation of valves 52, 102 and 262, as well as the level control valve 240, thus providing for continuous flow of the liquid to avoid any piping sections having still, nonflowing liquid. It may also be noted that reservoir 60, heat exchanger 56, cooking chamber 34 and cooling chamber 238 are all provided with pressure relief valves 266 to avoid any undue buildup of pressure within.

Once the product within cooking chamber 34 is fully cooked, the next step is to drain the liquid from that chamber by maintaining valve 240 open from a signal from register 256 while closing the supply valves 52 and 102. This will return substantially all of the liquid from cooking chamber 34 to the reservoir 60, with some diversion possible by valve 244 through line 246 for reasons described above. When the liquid has been substantially drained from cooking chamber 34, the actuator 146 opens the discharge port 147, passing the cooked food product from the cooking chamber 34 into the cooling chamber 238. This cooling chamber 238 is generally similar in construction to that of cooking chamber 34 and includes a self-cleaning rotary disk filter assembly 274 of substantially the same construction and manner of operation as the filter assembly 74 in the cooking chamber 34.

In the cooling chamber there is provided cold liquid, which preferably is sterile, from the cold liquid supply system comprising the cold liquid reservoir 154 and associated apparatus. In the cold liquid reservoir 154 the level of liquid is measured by the level transducer 268 whose signal is sent through the level indicating controller 270 and actuator 272 to control the valve 262 which delivers or recirculates sterilized hot liquid coming from the hot circuit through line 260. Also associated with the controller 270 are low level alarm 271 and high level alarm 273, which serve to warn if the level of the cold liquid in the reservoir 154 goes outside predetermined limits and requires attention. It is preferred to maintain within the cold liquid reservoir 154 a slight overpressure of an inert gas, such as nitrogen, to reduce the likelihood of oxidation or contamination of the sterile cold liquid within. Accordingly, the pressure within the reservoir 154 is detected by an appropriate transducer 276, which provides the signal to the pressure indicating controller 278 which then activates the controller 280 to control valve 282. The controller then operates valve 282 to allow introduction of pressurized inert gas through line 284, which then flows through line 286 into the cold liquid reservoir 154.

The cold liquid from the reservoir 154 is moved by pump 288 to the cold liquid circuit through a heat removing heat exchanger 290, which receives an appropriate coolant, which may suitably be water, glycol or brine, at a predetermined low temperature, suitably not more than about 5° C. This coolant is supplied from a coolant reservoir 292, which may include either a mechanical refrigeration system or an ice bank. To maintain a desired predetermined temperature of the cold liquid flowing in the circuit, the temperature of the liquid upon its exit from the heat removing heat exchanger 290 is measured by transducer 294, which provides signals to the temperature indicator controller 296, which controls the operator 298 for valve 300, which permits or stops flow of the coolant from the coolant reservoir 292 through the heat exchanger 290. This establishes a stable temperature for the liquid leaving the heat exchanger 290, and a flow switch 302 in line 156 sending control signals to pump 288 provides for a suitably constant level of liquid flow through that line 156.

When there is food product in the cooling chamber 238 to be cooled, the cold liquid flowing through line 156 enters that cooling chamber 238 through valve 304. The cold liquid then leaves the chamber 238 through valve 306, flowing through line 308 in its return to the cold liquid reservoir 154. A temperature transducer 310 measures the temperature of this returning liquid and provides a signal to the temperature indicator controller 312, which sends a signal to the valve 304 to terminate further introduction of the cold liquid into the cooling chamber 238 when the desired predetermined low temperature of the products is reached. At this point the liquid leaving the heat exchanger 290 will then be diverted by valve 304 through bypass line 314 back to the reservoir 154. During the cooling process the level of the cold liquid within the chamber 238 is measured by sensor 316, which can determine the presence of either an excessive amount of the cold liquid or an insufficient amount and the provides a signal to the level indicator controller 318 to the valve 306 to reduce or increase the outflow of the cold liquid back to the reservoir 154, to maintain a desired level within the chamber 238.

As with the reservoir 154, it is desired to maintain a slight overpressure of an inert gas above the liquid to reduce the likelihood of oxidation or contamination. Accordingly, pressure transducer 320 detects the pressure within the chamber 238 and provides a signal to the pressure indicator controller 322, which operates actuator 324 controlling valve 326 to introduce a sufficient amount of inert gas, such as nitrogen, into cooling chamber 238 from a feed line 328.

When the temperature of the cold liquid returning through line 308 has reached the desired low temperature, which may suitably be about 36° C., the level sensor 316, through its control of valve 306, provides for draining the cold liquid from the cooling chamber 238 to obtain the desired, predetermined total combined volume of the cooled food product and liquid to be deposited into a shipping container. At that point an appropriate shipping container is introduced into the delivery chamber 160 in the manner described with respect to the embodiment of FIG. 4 above, with the container and its head being appropriately sterilized, and the actuator 330 opens the delivery port to deposit the cooled food product and liquid into the container, as described with respect to the embodiment of FIG. 4. During this delivery step the steam valve 237 preferably is opened, serving both to urge the food product and liquid out of the cooling chamber and to maintain a sterile environment within that chamber. The shipping container is then sealed in the manner described above, and the container removed from its engagement with the filling enclosure 160 and delivered to an appropriate storage location. With the filling and sealing of the shipping container, the entire process may then begin again.

As with the cooking chamber and cooling chamber, it may be noted that the cold liquid reservoir 154 and the cold liquid pump 288 also include provision for sterilizing flows of steam. Valve 332 provides for introduction of steam into the reservoir 154 for this purpose. Inlet 334 introduces steam into pump 288 through pressure gauge 336 and pressure reducer 338.

While the foregoing describes three particularly preferred embodiments of the apparatus and method of this invention, it is to be understood that these descriptions are merely illustrative of the principles of the present invention and are not to be considered limitative thereof. Accordingly, because numerous variations and modifications of this apparatus and method, all within the scope of this invention, will readily occur to those skilled in the art, the invention is to be limited solely by the claims appended hereto.

What is claimed is:

1. A batch processing method for cooking and packing pieces of a food product comprising fruits or vegetables, comprising the steps of
    collecting a batch comprising a predetermined quantity of an uncooked food product;
    depositing by gravity flow said quantity of uncooked food product into a closed cooking chamber having a selectively openable and closable entrance port and a selectively openable and closable delivery port;
    heating said batch of said food product by introducing into said cooking chamber a quantity of liquid for use with said food product and recirculating said liquid through heat exchanging means to heat said liquid and said food product contacted thereby to a cooking and sterilizing temperature;
    removing said liquid from said cooking chamber until the total combined volume of said liquid and said food product remaining substantially equals the desired quantity of said food product and said liquid desired to be deposited into a predetermined shipping container for said food product and liquid; and
    depositing said remaining food product and liquid directly from said cooking chamber through said selectively openable and closable delivery port into said shipping container and sealing said shipping container.

2. The method of claim 1 wherein said liquid is heated to a temperature of about 110° C. prior to introduction into said cooking chamber.

3. The method of claim 1 wherein said cooking and sterilizing temperature is about 98° C.

4. The method of claim 3 further comprising the step of continuing said recirculation of said liquid for a predetermined time period after said cooking and sterilizing temperature is reached.

5. The method of claim 1 wherein said cooking and sterilizing temperature is measured by the temperature of said recirculating liquid leaving said cooking chamber.

6. The method of claim 1 further comprising the step of providing within said cooking chamber prior to said depositing of said food product a quantity of said liquid to cushion the fall of said food product into said cooking chamber.

7. The method of claim 1 wherein said liquid comprises juice derived from said food product.

8. The method of claim 1 further comprising the step of introducing additional said liquid into said cooking chamber after said food product has been deposited within said chamber to bring the level of said liquid within said chamber to a predetermined maximum level for said recirculation.

9. The method of claim 8 wherein said recirculation includes returning said liquid from said cooking chamber to a liquid supply tank and then feeding said liquid from said supply tank to said cooking chamber.

10. The method of claim 9 further comprising the step of maintaining substantially continuous circulation of said liquid in pipes connecting said supply tank and said cooking chamber, whereby piping sections with still, nonmoving liquid are substantially avoided.

11. The method of claim 8 further comprising the step of measuring the acidity level of said liquid and introducing an acidifying material as needed to maintain said acidity level in a predetermined range.

12. The method of claim 8 wherein said recirculation of said liquid includes the steps of withdrawing said liquid from said cooking chamber through a filter comprising a disc member having an axis of rotation generally transverse to the surface thereof, with said disc being rotatably driven about said axis and having a plurality of apertures extending through said disc and being sized to permit said liquid to pass therethrough while blocking passage of said food product, said disc having its periphery slidably sealed to a filter chamber with one side of said disc facing inwardly of said filter chamber, and said filter chamber having a liquid withdrawal conduit connected thereto, whereby liquid passing through said disc apertures is withdrawn from said chamber.

13. The method of claim 12 wherein said filter is oriented with said axis of rotation generally horizontal and positioned within said cooking chamber such that said liquid withdrawal conduit is below said predetermined maximum level of said liquid.

14. The method of claim 13 further comprising the step of cleaning said filter disc apertures by directing at least one stream of said liquid at said disc apertures from within said filter chamber and at a location above said predetermined maximum level of said liquid, such that said liquid stream urges pieces of said product lodged in said apertures outwardly of said filter chamber.

15. The method of claim 12 wherein said filter comprises a pair of said rotatably driven disc members positioned generally coaxially and spaced apart with their respective said peripheries slidably sealed to said filter chamber on opposing sides thereof.

16. The method of claim 12 further comprising the step, prior to said depositing of said food product into said cooking chamber, of introducing steam into said cooking chamber and said filter, whereby the cooking chamber and filter are sterilized prior to receipt of the food product.

17. The method of claim 1 wherein said step of depositing said food product and liquid into said shipping container further comprises the steps of positioning said shipping container below said cooking chamber outlet and opening said delivery port to allow said food product and said liquid contained within said cooking chamber to fall into said shipping container.

18. The method of claim 17 wherein said product and said liquid are deposited into said shipping container at a temperature not substantially less than said cooking temperature.

19. The method of claim 17 further comprising the steps subsequent to said heating step and prior to said liquid removing step of substantially draining said heated liquid from said cooking chamber and introducing a cold liquid into contact with said product and continuing said cold liquid in contact with said product for a period of time sufficient to cool said product to a predetermined lower temperature by absorbing heat therefrom.

20. The method of claim 19 wherein said predetermined lower temperature is about 36° C.

21. The method of claim 19 wherein said steps of introducing said cold liquid into contact with said product and retaining said cold liquid in contact with said product include recirculating said cold liquid through a heat exchanger to remove from said liquid heat gained from said contact with said product.

22. The method of claim 21 wherein said lower temperature is measured by measuring the temperature of said liquid after said contact of said liquid with said product.

23. The method of claim 22 wherein said liquid temperature is measured after said cold liquid leaves the chamber within which said product is held.

24. The method of claim 21 further comprising the step of measuring the temperature of said recirculating liquid leaving said heat-removing heat exchanger and adjusting the operation of said heat exchanger to maintain a predetermined temperature of said liquid leaving said heat-removing heat exchanger, whereby the temperature of the cold liquid introduced into contact with the product is controlled.

25. The method of claim 19 comprising the step subsequent to said cooling of said product of removing from the chamber holding said product sufficient said cold liquid to obtain a total combined volume of said liquid and said product substantially equal to the quantity of said food product and said liquid desired to be deposited into said shipping container.

26. The method of claim 19 further comprising the step of moving said drained product from said cooking chamber to a separate cooling chamber prior to said introduction of said cold liquid, whereby the cooling process takes place in a chamber separated from the cooking chamber.

27. The method of claim 26 wherein said steps of introducing said cold liquid into contact with said product and retaining said cold liquid in contact with said product include recirculating said cold liquid through a heat exchanger to remove from said liquid heat gained from said contact with said product.

28. The method of claim 27 further comprising the step of measuring the temperature of said recirculating liquid leaving said heat-removing heat exchanger and adjusting the operation of said heat exchanger to maintain a predetermined temperature of said leaving liquid.

29. The method of claim 26 comprising the step subsequent to said cooling of said product of removing from the chamber holding said product sufficient said cold liquid to obtain a total combined volume of said liquid and said product substantially equal to the desired quantity of said food product and said liquid desired to be deposited into said shipping container.

30. The method of claim 26 wherein said recirculation of said liquid includes the steps of withdrawing said liquid from said cooking chamber through a filter comprising a disc member having an axis of rotation generally transverse to the surface thereof, with said disc being rotatably driven about said axis and having a plurality of apertures extending through said disc and being sized to permit said liquid to pass therethrough while blocking passage of said food product, said disc having its periphery slidably sealed to a filter chamber with one side of said disc facing inwardly of said filter chamber, and said filter chamber having a liquid withdrawal conduit connected thereto, whereby liquid passing through said disc apertures is withdrawn from said chamber.

31. The method of claim 30 wherein said filter is oriented with said axis of rotation generally horizontal and positioned within said cooking chamber such that said liquid withdrawal conduit is below said predetermined maximum level of said liquid.

32. The method of claim 31 further comprising the step of cleaning said filter disc apertures by directing at least one stream of said liquid at said disc apertures from within said filter chamber and at a location above said predetermined maximum level of said liquid, such that said liquid stream urges pieces of said product lodged in said apertures outwardly of said filter chamber.

33. The method of claim 32 wherein said filter comprises a pair of said rotatably driven disc members positioned generally coaxially and spaced apart with their respective said peripheries slidably sealed to said filter chamber on opposing sides thereof.

34. The method of claim 21 wherein said recirculating liquid is held within a cold liquid reservoir subsequent to said liquid leaving said contact with said product and prior to said liquid passing through said heat-removing heat exchanger, and wherein said reservoir is pressurized by a non-oxidizing gas.

35. The method of claim 19 wherein said container positioning step comprises sealingly introducing an upper portion of said shipping container into a sterilizing chamber connected to said cooking chamber delivery port and sterilizing said upper portion and the interior of said shipping container and then introducing said liquid and said cooled food product into said container in an aseptic manner and sealing said container in an aseptic manner.

* * * * *